(12) United States Patent
Syme et al.

(10) Patent No.: US 8,992,356 B2
(45) Date of Patent: Mar. 31, 2015

(54) SYNTHETIC FIBER BALL

(71) Applicants: Mary Dianne Syme, New Castle, IN (US); Juanita Kay Donica, New Castle, IN (US)

(72) Inventors: Mary Dianne Syme, New Castle, IN (US); Juanita Kay Donica, New Castle, IN (US)

(73) Assignee: KM Innovations LLC, New Castle, IN (US)

( * ) Notice: Subject to any disclaimer, the term of this patent is extended or adjusted under 35 U.S.C. 154(b) by 0 days.

(21) Appl. No.: 13/909,560

(22) Filed: Jun. 4, 2013

(65) Prior Publication Data

US 2014/0356553 A1    Dec. 4, 2014

(51) Int. Cl.
*A63B 43/00*    (2006.01)
*B29C 67/00*    (2006.01)

(52) U.S. Cl.
CPC ............... *B29C 67/00* (2013.01); *A63B 43/00* (2013.01)
USPC ...................................................... 473/614

(58) Field of Classification Search
CPC ... A63B 2043/001; A63B 43/00; B29C 67/00
USPC ............... 473/614, 596, 575, 576, 280, 281; 482/4–5
See application file for complete search history.

(56) References Cited

U.S. PATENT DOCUMENTS

| | | | | |
|---|---|---|---|---|
| 1,548,531 A * | 8/1925 | Knight | ......................... | 473/280 |
| 2,213,013 A * | 8/1940 | Owen | ......................... | 473/281 |
| 2,450,474 A * | 10/1948 | Grobner | ..................... | 473/280 |
| 3,759,518 A * | 9/1973 | Mroz | ............................ | 473/588 |
| 4,131,276 A * | 12/1978 | Judkins | ........................ | 473/575 |
| 4,585,676 A * | 4/1986 | DeSmet et al. | .................. | 428/5 |
| 4,634,612 A * | 1/1987 | Nelson et al. | ..................... | 428/4 |
| 4,724,175 A * | 2/1988 | LaBrosse et al. | ................. | 428/4 |
| 4,756,529 A * | 7/1988 | Stillinger | ..................... | 473/614 |
| 4,884,807 A * | 12/1989 | Welch | .......................... | 473/575 |
| 4,962,926 A * | 10/1990 | Chen | ............................. | 473/614 |
| 5,476,267 A * | 12/1995 | Gertsikov | ..................... | 473/580 |
| 5,516,099 A * | 5/1996 | Strong | ......................... | 473/614 |
| 6,280,356 B1 * | 8/2001 | Sandeen | ....................... | 473/614 |
| 2007/0270233 A1* | 11/2007 | Ruston | ......................... | 473/280 |
| 2010/0311528 A1* | 12/2010 | Golden-Morace | ........... | 473/614 |

* cited by examiner

*Primary Examiner* — Steven Wong
(74) *Attorney, Agent, or Firm* — Dean McConnell IP Law

(57) ABSTRACT

A synthetic fiber ball and method of manufacturing the same is disclosed. The fiber ball includes a plurality of fibers having a predetermined length bound together with a fastening fiber at a central core. The plurality of fibers extend outwardly from the fastening fiber at the central core to form a generally spherical shaped ball. The plurality of fibers are heat shrunk in a spinning oven from a generally cylindrical shaped fiber bundle having a predetermined diameter to form the fiber ball.

7 Claims, 3 Drawing Sheets

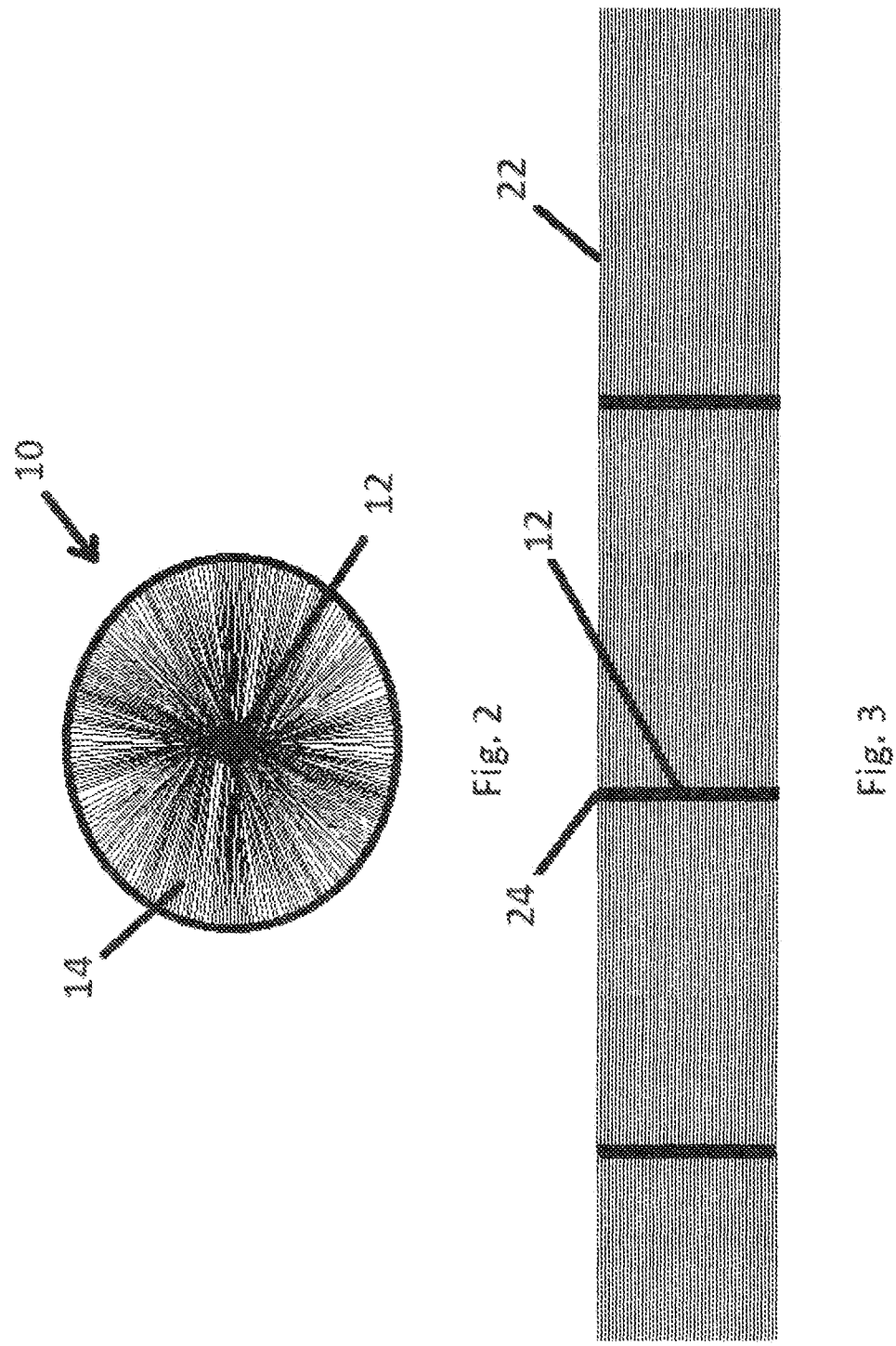

SYNTHETIC FIBER BALL

FIELD OF THE INVENTION

The present invention relates generally to a ball, and more particularly, to a synthetic fiber ball that looks, feels, and sounds like a snowball.

BACKGROUND

Playing with snowballs is a childhood past time that many children that have the opportunity do. Unless there is snow on the ground, children, and adults for that matter, cannot play with snowballs. In addition, children must go outside to play with snowballs if snow is on the ground and weather conditions may make such ventures unhealthy. As such, a need exists for a way to play with a snowball like object without the need to have snow and venture outside in dangerous weather conditions.

SUMMARY

A fiber ball is disclosed that looks like a snowball, feels like a snowball and sounds like a snowball when compressed. In addition, a method of manufacturing a fiber snowball is disclosed.

BRIEF DESCRIPTION OF THE DRAWINGS

The invention is further elucidated in the following on the basis of an exemplary embodiment shown in the drawings.

FIG. 2 illustrates a cross-section of the fiber snowball illustrated in FIG. 1.

FIG. 3 illustrates a fiber bundle strand.

DETAILED DESCRIPTION

Figure 1:
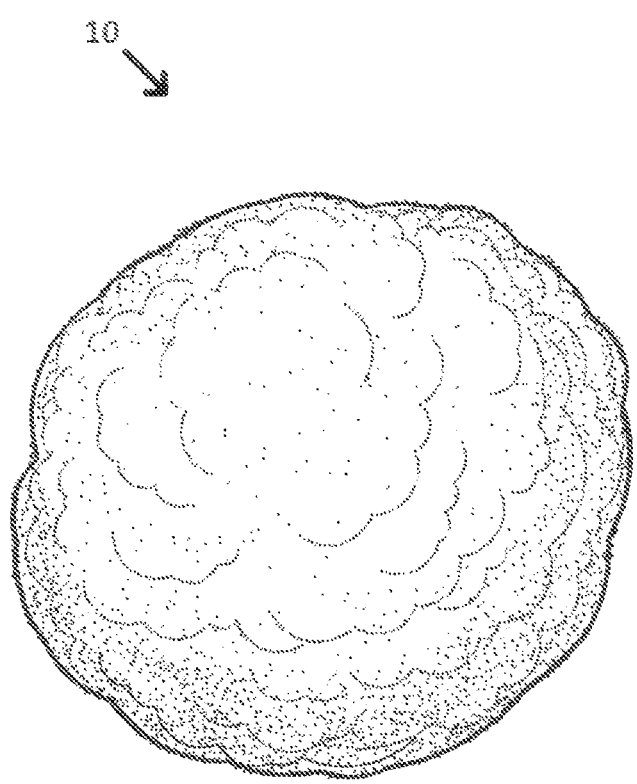
FIG. 1 illustrates a fiber snowball.

Referring to FIG. 1, a synthetic or non-synthetic fiber ball 10 is disclosed that includes all of the qualities of a regular soft packed ball that can be used for a variety of indoor or outdoor games and entertainment. In one form, the synthetic ball 10 is formed having a generally circular or ball shape, but other shapes are envisioned, such as a football shape, for example. The synthetic ball 10 is soft, resilient, machine washable, and can be formed in a variety of sizes. In one form, the synthetic ball 10 is sold as a bundle of balls 10 that can be used in a simulated ball fight game that can be held indoors throughout the year. The synthetic balls 10 are soft and scrunchy that no matter how fast they are thrown, they will cause no discomfort upon impact. The synthetic balls 10 are designed to compress or deform upon impact to disperse energy and then recover to their original form after impact.

Synthetic fibers are fibers that are generally created as the result of research to improve naturally occurring animal and plant fibers. In general, synthetic fibers are created by forcing, usually through extrusion, fiber forming materials through holes (called spinnerets) into the air, forming a bead. Synthetic fibers can also be made from synthesized polymers or small molecules. Non-synthetic fibers are fibers that are formed from animals (such as cotton) and plant fibers.

Referring to FIG. 2, the synthetic ball 10 comprises a fastening fiber 12 that is located at a central core of the ball 10. In one form, the fiber ball 10 has a radius from the central core of the fiber ball 10 of about 1.5 inches. As such, the diameter of the fiber ball 10 is about 3 inches. Extending outwardly from the fastening fiber 12 are a plurality of fibers 14. The fibers 14 extend outwardly from the fastening fiber 12 such that a generally spherical shaped ball is formed. As set forth in greater detail below, the balls 10 are formed through a unique manufacturing process that creates a unique look and feel to the balls 10.

Referring to FIG. 3-6, the first step in creating the balls 10 is a process called fiber bundling 20. At this step, a fiber bundling machine 30 is used to bundle the fibers 14 to a predetermined size thereby creating a fiber bundle strand 22. As such, the fiber bundling machine 30 bundles the fibers 14 together by gathering each single fiber 14 on each fiber reel 32 together up into the fiber bundle strand 22. It should be appreciated that a plurality of fiber reels 32 are used to create the fiber bundle strand 22. In the preferred form, the fiber bundle 22 has a generally cylindrical or tubular shape with a diameter of about 2 inches. After the fiber bundle strand 22 is formed, the fastening fiber 12 is placed at predetermined points 24 along the fiber bundle strand 22. In one form, the fiber bundling machine 30 is used to place the fastening fiber 12.

Figure 4:
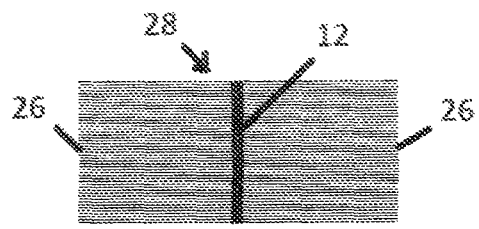
FIG. 4 illustrates a fiber bundle.
Figure 5:
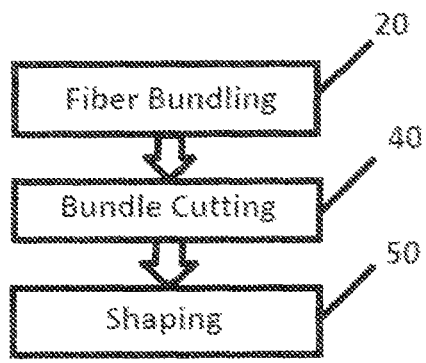
FIG. 5 illustrates the steps used to manufacture the fiber ball.
Figure 6:
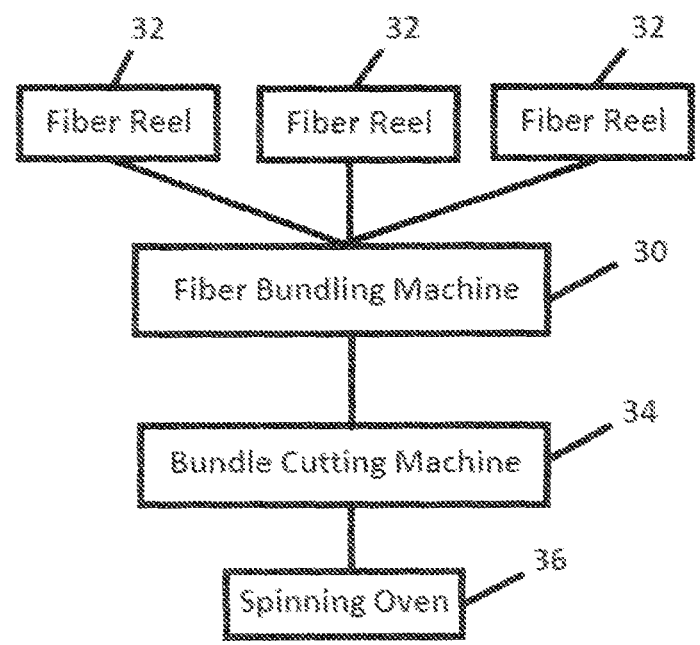
FIG. 6 illustrates the machines used to manufacture the fiber ball.

The next step in forming the balls 10 is a process bundle cutting 40. In this step, a bundle cutting machine 34 is used to cut the fiber bundle strand 22 at a required length. The distance from the fastening fiber 12 to both cut ends 26 must be equal. In one form, the distance from the fastening fiber 12 to both cut ends 26 is about 2.5 inches. Equal distance makes the fiber ball 10 round after the shaping oven process is complete. Non-equal distance will result in non-round fiber balls. As a result of this step, a generally cylindrical shaped cut fiber bundle 28 is formed which is illustrated in FIG. 4.

Once the generally cylindrical shaped fiber bundles 28 are formed, the next step in the process of creating the fiber balls 10 is shaping 50. At this step, a spinning oven 36 is used to shape the generally cylindrical shaped fiber bundles 28 into the fiber ball 10. This process is very critical to make the fiber ball 10 feel like a snowball and sound like a snowball. In one form, the spinning oven 36 is set up at 80° C. and the fiber bundles 28 are heated for about 10-12 minutes. In another form, the spinning oven 36 is set up at 100° C. and the fiber bundles are heated for about 8 minutes. In yet another form, the spinning oven 36 is set up at 120° C. and the fiber bundles are heated for about 6 minutes. The spinning oven 36 is also set at a predetermined spinning speed to properly form the fiber ball 10.

The temperature and timing is critical to make the fiber ball 10 at just the right size and hardness. If the temperature is set up to high or the timing is longer, then the fiber ball 10 will be too hard and will not remain in a good looking snowball type shape and will not feel like a snowball or sound like a snowball. If the temperature is set to low or the timing is too short, then the fiber ball 10 will come out too soft and will not remain in a good looking shape and cannot come back to a ball shape after impact. The spinning oven 36 must also continuously spin during the shaping process. During the shaping process, the fiber bundles 28 shrink to form the fiber ball 10.

Although embodiments of the invention have been described using specific terms, such description is for illustrative purposes only, and it is to be understood that changes and variations obvious to the skilled artisan are to be considered within the scope of the claims that follow and their equivalents.

What is claimed is:

1. A fiber ball, comprising:
a fiber bundle strand having a predetermined length bound together with a fastening fiber at a central core, wherein said fiber bundle strand comprises a plurality of individual fiber beads formed by forcing fiber material through a spinneret, wherein said plurality of individual fiber beads extend outwardly and away from said fastening fiber at said central core to form a generally spherical shaped ball.

2. The fiber ball of claim 1, wherein said predetermined length is about 3 inches.

3. The fiber ball of claim 1, wherein said fiber ball feels like a snowball.

4. The fiber ball of claim 1, wherein said fiber ball emits a sound like a snowball when compressed.

5. The fiber ball of claim 1, wherein said fiber ball has characteristics of a soft and scrunchy ball.

6. The fiber ball of claim 1, wherein said fiber ball is operable to compress and deform upon impact thereby dispersing energy generated at impact.

7. The fiber ball of claim 6, wherein said fiber ball is designed to recover to its original form after impact.

* * * * *